(12) United States Patent
Werle et al.

(10) Patent No.: US 8,393,850 B2
(45) Date of Patent: Mar. 12, 2013

(54) INFLATABLE WIND TURBINE

(75) Inventors: Michael J. Werle, West Hartford, CT (US); William Scott Keeley, Charlestown, RI (US); Thomas J. Kennedy, III, Wilbraham, MA (US); Walter M. Presz, Jr., Wilbraham, MA (US)

(73) Assignee: FloDesign Wind Turbine Corp., Waltham, MA (US)

( * ) Notice: Subject to any disclaimer, the term of this patent is extended or adjusted under 35 U.S.C. 154(b) by 516 days.

(21) Appl. No.: 12/555,446

(22) Filed: Sep. 8, 2009

(65) Prior Publication Data

US 2010/0068052 A1  Mar. 18, 2010

Related U.S. Application Data

(60) Provisional application No. 61/191,358, filed on Sep. 8, 2008.

(51) Int. Cl.
*F01D 25/28* (2006.01)

(52) U.S. Cl. .................................. 415/7; 416/84; 416/85

(58) Field of Classification Search ........ 415/7; 416/84, 416/85
See application file for complete search history.

(56) References Cited

U.S. PATENT DOCUMENTS

| | | | |
|---|---|---|---|
| 3,986,787 A | 10/1976 | Mouton, Jr. et al. | |
| 4,025,220 A * | 5/1977 | Thompson et al. | ............... 415/7 |
| 4,077,206 A | 3/1978 | Ayyagari | |
| 4,166,596 A * | 9/1979 | Mouton et al. | .................. 244/30 |
| 4,204,799 A | 5/1980 | de Geus | |
| 4,207,026 A | 6/1980 | Kushto | |
| 4,320,304 A | 3/1982 | Karlsson et al. | |
| 4,324,985 A | 4/1982 | Oman | |
| 4,547,124 A * | 10/1985 | Kliatzkin et al. | ............... 416/86 |
| 4,786,016 A | 11/1988 | Presz, Jr. et al. | |
| 5,110,560 A | 5/1992 | Presz, Jr. et al. | |
| 5,230,656 A | 7/1993 | Paterson et al. | |
| 5,464,320 A | 11/1995 | Finney | |
| 5,669,758 A | 9/1997 | Williamson | |
| 5,761,900 A * | 6/1998 | Presz, Jr. | ......................... 60/262 |
| 5,836,738 A | 11/1998 | Finney | |
| 5,884,472 A | 3/1999 | Presz, Jr. et al. | |
| 6,082,635 A | 7/2000 | Seiner et al. | |
| 6,382,904 B1 | 5/2002 | Orlov et al. | |
| 6,887,031 B1 | 5/2005 | Tocher | |
| 7,214,029 B2 | 5/2007 | Richter | |
| 7,220,096 B2 | 5/2007 | Tocher | |

(Continued)

FOREIGN PATENT DOCUMENTS

DE  101 45 786 A1  4/2003
EP  0 045 202  2/1982

(Continued)

OTHER PUBLICATIONS

International Search Report and Written Opinion of PCT/US2009/56185 mailed May 25, 2010.

(Continued)

*Primary Examiner* — Edward Look
*Assistant Examiner* — William Grigos
(74) *Attorney, Agent, or Firm* — McCarter & English, LLP

(57) ABSTRACT

A wind turbine has an impeller surrounded by a turbine shroud and/or an ejector shroud, wherein the turbine shroud and/or the ejector shroud include inflatable portions and/or flexible inflatable portions. In some embodiments, the turbine shroud and/or the ejector shroud include internal rib members whose shape or length can be changed to alter the characteristics of the wind turbine.

27 Claims, 16 Drawing Sheets

U.S. PATENT DOCUMENTS

| | | | |
|---|---|---|---|
| 7,335,000 | B2 | 2/2008 | Ferguson |
| 7,600,963 | B2 | 10/2009 | Miller |
| 8,021,100 | B2 * | 9/2011 | Presz et al. ............... 415/4.3 |
| 2004/0156710 | A1 | 8/2004 | Gaskell |
| 2008/0232957 | A1 | 9/2008 | Presz et al. |
| 2009/0087308 | A2 | 4/2009 | Presz, Jr. et al. |
| 2009/0097964 | A1 | 4/2009 | Presz, Jr. et al. |
| 2009/0214338 | A1 | 8/2009 | Werle et al. |
| 2010/0090473 | A1 | 4/2010 | Glass |
| 2010/0284802 | A1 | 11/2010 | Presz, Jr. et al. |
| 2011/0014038 | A1 * | 1/2011 | Werle et al. ............... 415/200 |

FOREIGN PATENT DOCUMENTS

| | | |
|---|---|---|
| RU | 2147693 C1 | 4/2000 |
| WO | WO 03/078833 A1 | 9/2003 |
| WO | 2004/099607 A2 | 11/2004 |
| WO | WO 2006/019478 A1 | 2/2006 |
| WO | WO 2008/157013 A1 | 12/2008 |
| WO | WO 2010/028342 A2 | 3/2010 |
| WO | WO 2010/028342 A3 | 3/2010 |
| WO | WO 2010/141715 A2 | 12/2010 |
| WO | WO 2010/141867 A2 | 12/2010 |
| WO | 2011031365 A2 | 3/2011 |

OTHER PUBLICATIONS

Hansen et al., "Effect of Placing a Diffuser Around a Wind Turbine," Wind Energy, 2000, pp. 3:207-213.

Igra, Ozer, "Research and Development for Shrouded Wind Turbines," Energy Cons. & Management, 1981, pp. 13-48. vol. 21.

Igra, Ozer, "Shrouds for Aerogenerators," AIAA Journal, Oct. 1976, pp. 1481-1483. vol. 14, No. 10.

International Preliminary Report on Patentability for International Application No. PCT/US2010/039908, mailed Mar. 13, 2012, 8 pages.

International Preliminary Report on Patentability for International Patent Application No. PCT/US2010/037251, mailed Dec. 6, 2011, 7 pages.

International Preliminary Report on Patentability for International Application No. PCT/US2009/56185, mailed Mar. 8, 2011, 6 pages.

International Search Report for International Application No. PCT/US20101039908, mailed Apr. 4, 2011, 4 pages.

Werle M.J. & Presz Jr., W. M., "Ducted Wind/Water Turbines and Propellers Revisited," Journal of Propulsion and Power, vol. 24, No. 5 (2008), 1146-1150.

* cited by examiner

INFLATABLE WIND TURBINE

This application claims priority to U.S. Provisional Patent No. 61/191,358, filed on Sep. 8, 2008. The provisional application is hereby fully incorporated by reference.

BACKGROUND

The present disclosure relates to wind turbines, particularly systems using inflatable components.

Conventional wind turbines used for power generation generally have two to five open blades arranged like a propeller, the blades being mounted to a horizontal shaft attached to a gear box which drives a power generator. Such turbines are generally known as horizontal axis wind turbines, or HAWTs. Although HAWTs have achieved widespread usage, their efficiency is not optimized. In particular, they will not exceed the Betz limit of 59.3% efficiency in capturing the potential energy of the wind passing through it.

Conventional wind turbines have three blades and are oriented or pointed into the wind by computer controlled motors. These turbines typically require a supporting tower ranging from 60 to 90 meters in height. The blades generally rotate at a rotational speed of about 10 to 22 rpm. A gear box is commonly used to step up the speed to drive the generator, although some designs may directly drive an annular electric generator. Some turbines operate at a constant speed. However, more energy can be collected by using a variable speed turbine and a solid state power converter to interface the turbine with the generator.

Several problems are associated with HAWTs in both construction and operation. The tall towers and long blades are difficult to transport. Massive tower construction is required to support the heavy blades, gearbox, and generator. Very tall and expensive cranes and skilled operators are needed for installation. In operation, HAWTs require an additional yaw control mechanism to turn the blades toward the wind. HAWTs typically have a high angle of attack on their airfoils that do not lend themselves to variable changes in wind flow. HAWTs are difficult to operate in near ground, turbulent winds. Ice build-up on the nacelle and the blades can cause power reduction and safety issues. Tall HAWTs may affect airport radar. Their height also makes them obtrusively visible across large areas, disrupting the appearance of the landscape and sometimes creating local opposition. Finally, downwind variants suffer from fatigue and structural failure caused by turbulence.

It would be desirable to reduce the mass and size of wind turbines.

SUMMARY

The present disclosure describes wind turbines of reduced mass and size. In particular, the wind turbines include a shroud and/or ejector having inflatable components. Such wind turbines are lighter. An inflated shroud and/or ejector would allow the turbine to change its aerodynamics/shape to accommodate changes in fluid flow. It would also allow for less substantial supports in the turbine body, and also allow the inflated portions to be deflated and stored if needed due to adverse weather conditions. The inflated portions of the turbine do not actively rotate to aid in energy extraction or power production.

Disclosed in embodiments is a wind turbine comprising: an impeller; and a turbine shroud disposed about the impeller, the turbine shroud comprising an inflatable member. The inflatable member may have the shape of a ring airfoil.

The turbine shroud may further comprise a first rigid structural member connected to the inflatable member. The shroud first rigid structural member may comprise a hollow interior into which the shroud inflatable member can be inserted. In some embodiments, the shroud first rigid structural member defines a leading edge of the turbine shroud.

The turbine shroud may further comprise a second rigid structural member connected to the shroud inflatable member opposite the shroud first rigid structural member, where the second rigid structural member defines a trailing edge of the turbine shroud.

The shroud second rigid structural member can be shaped to provide the turbine shroud with a plurality of lobes. Alternatively, the shroud inflatable member is shaped to provide a plurality of lobes around a trailing edge thereof.

The wind turbine may further comprise an ejector shroud disposed concentrically about the turbine shroud, the ejector shroud comprising an inflatable member. The ejector shroud may further comprise a first rigid structural member connected to the ejector inflatable member. Again, the ejector first rigid structural member can comprise a hollow interior into which the ejector inflatable member can be inserted. The ejector first rigid structural member may also define a leading edge of the ejector shroud.

The ejector shroud may further comprise a second rigid structural member connected to the ejector inflatable member opposite the ejector first rigid structural member, the second rigid structural member defining a trailing edge of the ejector shroud. The ejector second rigid structural member can be shaped to provide the ejector shroud with a plurality of lobes.

The ejector inflatable member can be configured so that when the ejector inflatable member is partially inflated, a trailing edge of the ejector inflatable member circumscribes an area which is less than an area circumscribed by a leading edge of the ejector inflatable member. The ejector inflatable member may also be shaped to provide a plurality of lobes around a trailing edge thereof.

Disclosed in other embodiments is a wind turbine comprising: a turbine shroud; and an ejector shroud disposed concentrically about the turbine shroud; the turbine shroud comprising a shroud circular member, a plurality of shroud first rib members engaging the shroud circular member, and a shroud exterior film, wherein the shroud circular member and the plurality of shroud first rib members define an intake end and an exhaust end of the turbine shroud; and the ejector shroud comprising an ejector circular member, a plurality of ejector first rib members engaging the ejector circular member, and an ejector exterior film, wherein the ejector circular member and the plurality of ejector first rib members define an intake end and an exhaust end of the ejector shroud.

The turbine shroud may further comprise a plurality of shroud second rib members. Each shroud second rib member extends between the shroud circular member and the ejector circular member. Together, the plurality of shroud first rib members and the plurality of shroud second rib members define a plurality of mixer lobes at the exhaust end of the turbine shroud.

The ejector shroud may further comprise a plurality of ejector second rib members engaging the ejector circular member. Together, the plurality of ejector first rib members and the plurality of ejector second rib members define a plurality of mixer lobes at the exhaust end of the ejector shroud.

The ejector first rib member may comprise a stationary member and an actuated member joined together at a pivot to alter an angle between the stationary member and the actuator member.

The ejector first rib member may alternatively comprise a stationary member and an actuated member joined together so that the length of the ejector first rib member can be altered.

Also disclosed is a wind turbine comprising: an impeller; a turbine shroud disposed about the impeller and having a plurality of mixing lobes disposed about an exhaust end; and an ejector shroud disposed about the turbine shroud, the ejector shroud comprising an inflatable member.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

DETAILED DESCRIPTION

Figure 1:
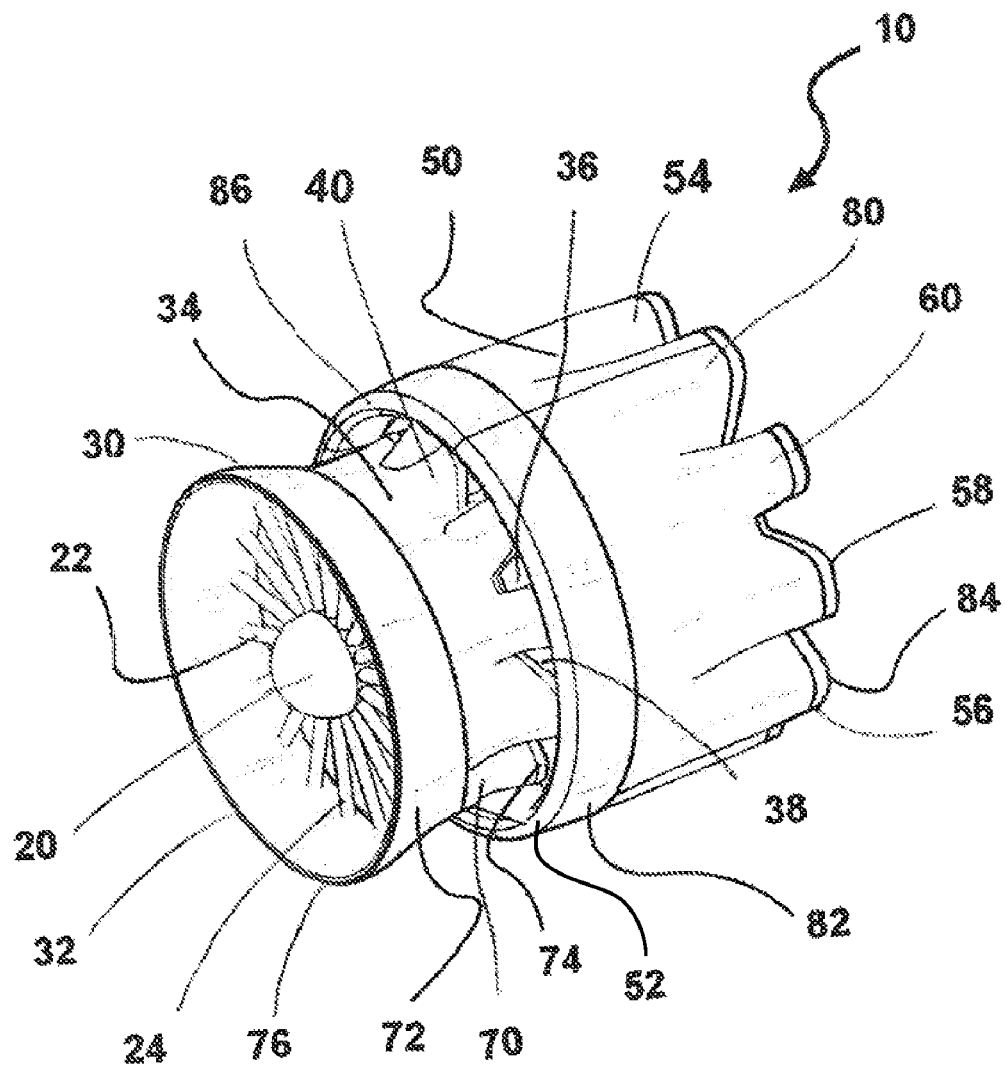
FIG. 1 is a perspective view of a first exemplary embodiment of the present disclosure.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Generally, the present disclosure comprises a wind turbine which includes inflatable components. This provides a wind turbine which has a lower mass compared to a HAWT.

FIG. 1 is a perspective view of a first embodiment of a wind turbine of the present disclosure, in a form also known as a mixer-ejector wind turbine (MEWT). The MEWT is a new type of wind turbine that uses a shrouded impeller, prop, or rotor/stator to improve the efficiency of a wind turbine such that more power may be extracted for a turbine having the same area than other current types of wind turbines. The MEWT accomplishes this by drawing air from a larger area than the most common type of wind turbine, the horizontal-axis wind turbine (HAWT).

A wind turbine can theoretically capture at most 59.3% of the potential energy of the wind passing through it, a maximum known as the Betz limit. The amount of energy captured by a wind turbine can also be referred to as the efficiency of the turbine. The MEWT may exceed the Betz limit.

Referring to FIG. 1, the turbine 10 comprises an impeller 20 located at an intake end 32 of a turbine shroud 30. The impeller may generally be any assembly in which blades are attached to a shaft and able to rotate, allowing for the generation of power or energy from wind rotating the blades. As illustrated here, the impeller 20 is a rotor-stator assembly. The stator 22 engages the turbine shroud 30, and the rotor (not shown) engages a motor/generator (not shown). The stator 22 has non-rotating blades 24 which turn the air before it reaches the rotor. The blades of the rotor then rotate, generating power in the generator. The shroud 30 comprises a ringed airfoil 34, or in other words is approximately cylindrical and has an airfoil shape, with the airfoil configured to generate relatively lower pressure within the turbine shroud (i.e. the interior of the shroud) and relatively higher pressure outside the turbine shroud (i.e. the exterior of the shroud). Put another way, the ringed airfoil has a cross-section shaped like an aircraft wing, as can be seen in FIGS. 4, 7, 12, 14, 17, and 19 of U.S. Patent Publication No. 2009/0087308, the entire disclosure of which is hereby incorporated by reference in its entirety. The impeller and the motor/generator are contained within the turbine shroud. The turbine shroud 30 may also have mixer lobes 40 around an outlet or exhaust end of the shroud. The mixer lobes are generally uniformly distributed around the circumference of the exhaust end. The mixer lobes generally cause the exhaust end 36 of the turbine shroud, where air exits, to have a generally peak-and-valley shape about its circumference. Put another way, the lobes 40 are located along the trailing edge 38 of the shroud.

The turbine 10 also comprises an ejector shroud 50, which is engaged with the turbine shroud. The ejector shroud comprises a ringed airfoil 54, or in other words is approximately cylindrical and has an airfoil shape, with the airfoil configured to generate relatively lower pressure within the ejector (i.e. between the turbine shroud 30 and the ejector shroud 50) and relatively higher pressure outside the ejector shroud 50. The ejector shroud may also have mixer lobes 60, in which case the wind turbine is a mixer-ejector wind turbine. The mixer lobes generally cause the exhaust end of the ejector 56, where air exits, to have a generally peak- and valley shape about its circumference. Put another way, the mixer lobes are located along the trailing edge 58 of the ejector shroud 50.

The ejector shroud 50 has a larger diameter than the turbine shroud 30. The turbine shroud 30 engages the ejector shroud 50. Put another way, the exhaust end 36 of the turbine shroud fits within the intake end 52 of the ejector shroud, or the intake end 52 of the ejector shroud surrounds the exhaust end 36 of the turbine shroud. The turbine shroud 30 and ejector shroud 50 are sized so that air can flow between them. Phrased another way, the ejector shroud 50 is concentrically disposed about the turbine shroud 30 and is downstream of the shroud 30. The impeller 20, turbine shroud 30, and ejector shroud 50 all share a common axis, i.e. are coaxial to each other.

The mixer lobes 40, 60 allow for advanced flow mixing and control. The turbine shroud and ejector shroud are different from similar shapes used in the aircraft industry because in the MEWT, flow path provides high-energy air into the ejector shroud. The turbine shroud provides low-energy air into the ejector shroud, and the high-energy air outwardly surrounds, pumps, and mixes with the low-energy air.

The motor/generator may be employed to generate electricity when the wind is driving the rotor. The generator on the turbine may also be used as a motor to drive the impeller 20, and thus draw air into and through the turbine 10, when the wind is insufficient to drive the rotor.

Referring again to FIG. 1, the turbine shroud 30 comprises an inflatable member 70, a first rigid structural member 72, and a second rigid structural member 74. The first rigid member defines the leading edge 76 of the shroud 30 and the second rigid member 74 defines the trailing edge 38 with a plurality of lobes 40 around the circumference of the trailing edge. The rigid members 72, 74 are connected to the inflatable member 70 opposite each other, i.e. on opposite sides of the inflatable member. The first rigid structural member 72 is annular. The first rigid structural member 72 provides a structure to support the impeller 20 and also acts as a funnel to channel air through the impeller. The inflatable member 70 is made up of a thin film material, as discussed later. The rigid members 72, 74 may be flexible, and are considered rigid relative to the inflatable member 70.

The ejector shroud 50 also comprises an inflatable member 80, a first rigid structural member 82, and a second rigid structural member 84. The first rigid member defines the leading edge 86 of the ejector 50 and the second rigid member 84 defines the trailing edge 58 with a plurality of lobes 60 around the circumference of the trailing edge. The rigid members 82, 84 are connected to the inflatable member 80 opposite each other, i.e. on opposite sides of the inflatable member. Again, the rigid members 82, 84 may be flexible, and are considered rigid relative to the inflatable member 80. The inflatable members 70, 80 may contain one large pocket to be inflated, or may contain multiple pockets that can be separately inflated/deflated.

Figure 2:
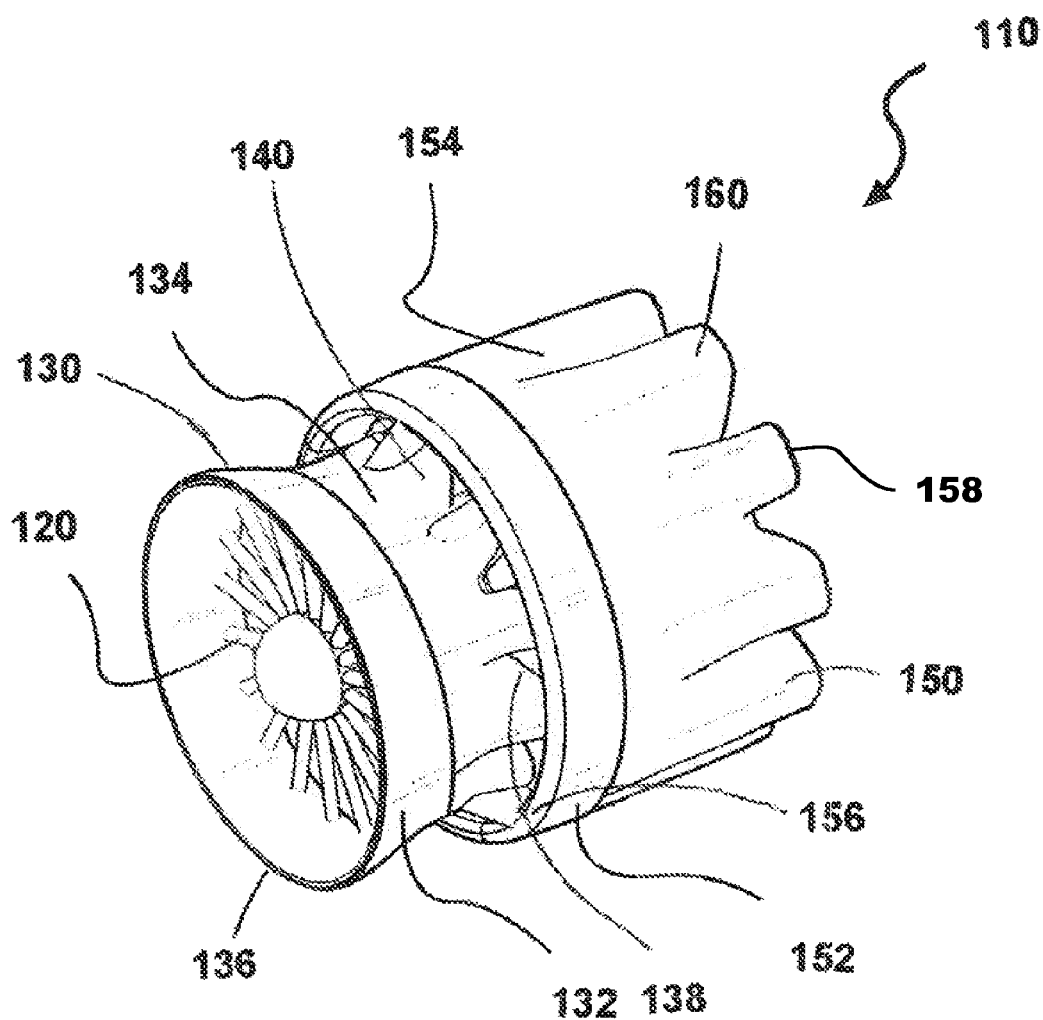
FIG. 2 is a perspective view of a second exemplary embodiment of the present disclosure.

FIG. 2 shows another exemplary embodiment of the turbine. The turbine 110 has an impeller 120, turbine shroud 130, and an ejector shroud 150. In this embodiment, the turbine shroud 130 comprises a first rigid structural member 132 connected to an inflatable member 134. The first rigid member 132 defines the leading edge 136 of the shroud 130. The shroud inflatable member 134 is shaped to provide a plurality of lobes 140 around the trailing edge 138 of the turbine shroud. In contrast to the embodiment of FIG. 1, only one rigid member is present to which the inflatable member is connected. Similarly, the ejector 150 comprises a first rigid structural member 152 connected to an inflatable member 154. The first rigid member 152 defines the leading edge 156 of the ejector shroud 150. The ejector inflatable member 154 is shaped to provide a plurality of lobes 160 around the trailing edge 158 of the ejector shroud. Put another way, in this embodiment there is no rigid member defining the lobes on the inflatable turbine shroud 130 and/or inflatable ejector shroud 150.

Figure 3:
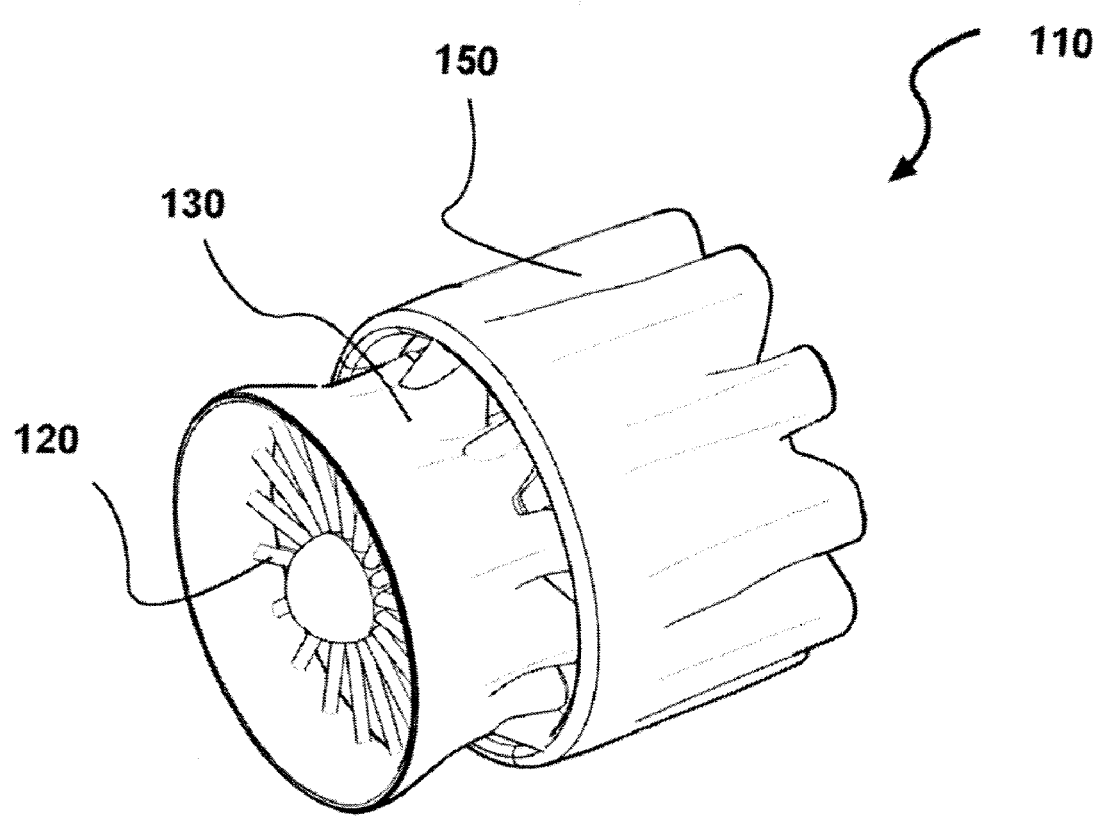
FIG. 3 is a perspective view of a third exemplary embodiment of the present disclosure.

FIG. 3 shows another exemplary embodiment of the turbine. The turbine 110 has an impeller 120, turbine shroud 130, and an ejector shroud 150. In this embodiment, the turbine shroud 130 comprises an inflatable member, and the ejector shroud 150 comprises an inflatable member. Put another way, there are no rigid structural members on the leading or trailing edge of either the turbine shroud or the ejector shroud.

Figure 4:
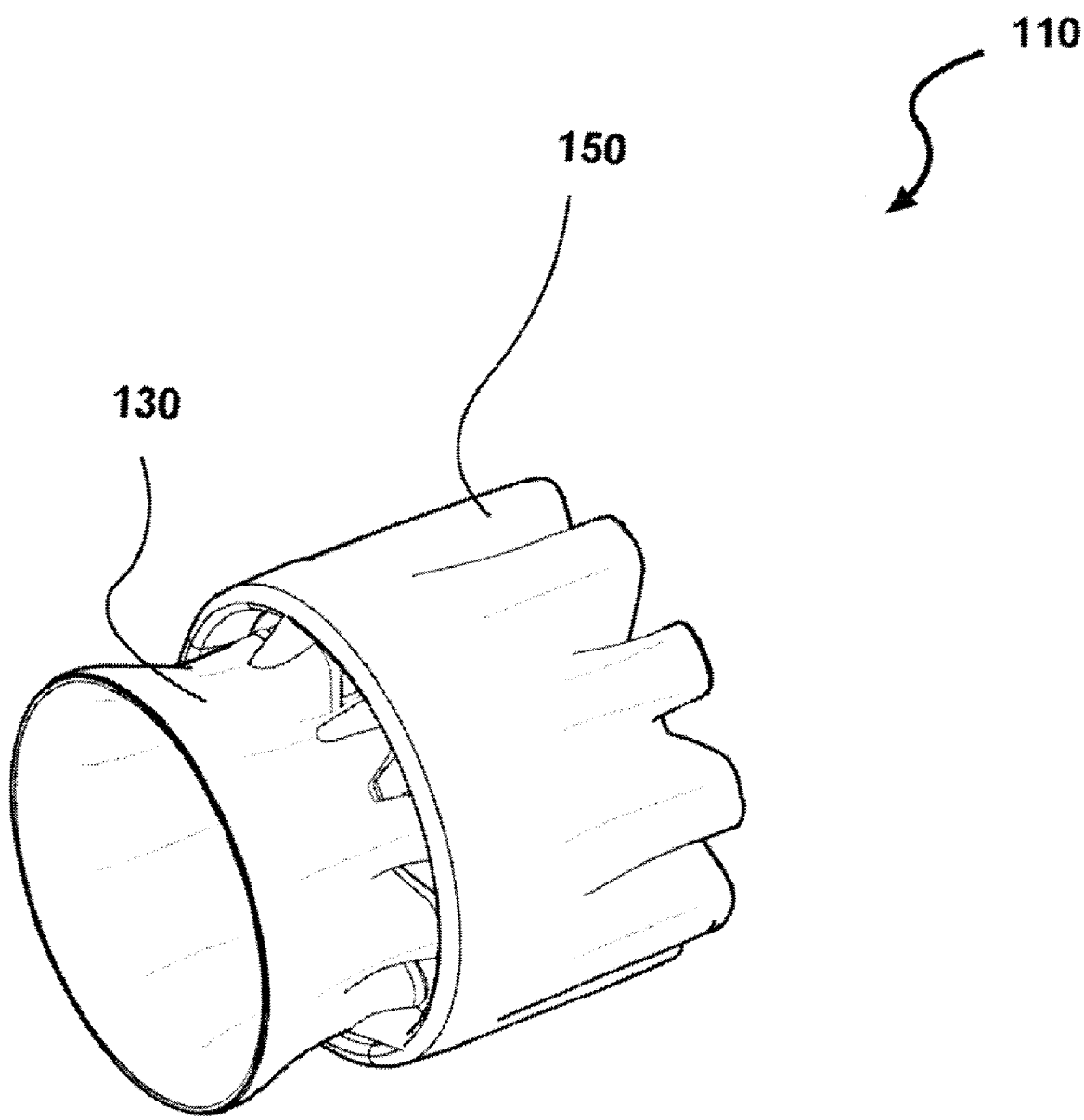
FIG. 4 is a perspective view of a fourth exemplary embodiment of the present disclosure.

FIG. 4 shows another exemplary embodiment. Here, a turbine shroud 130 and ejector shroud 150 are formed of inflatable materials and form a sub-assembly configured for retrofitting on an existing turbine or propulsion device.

Figure 5:
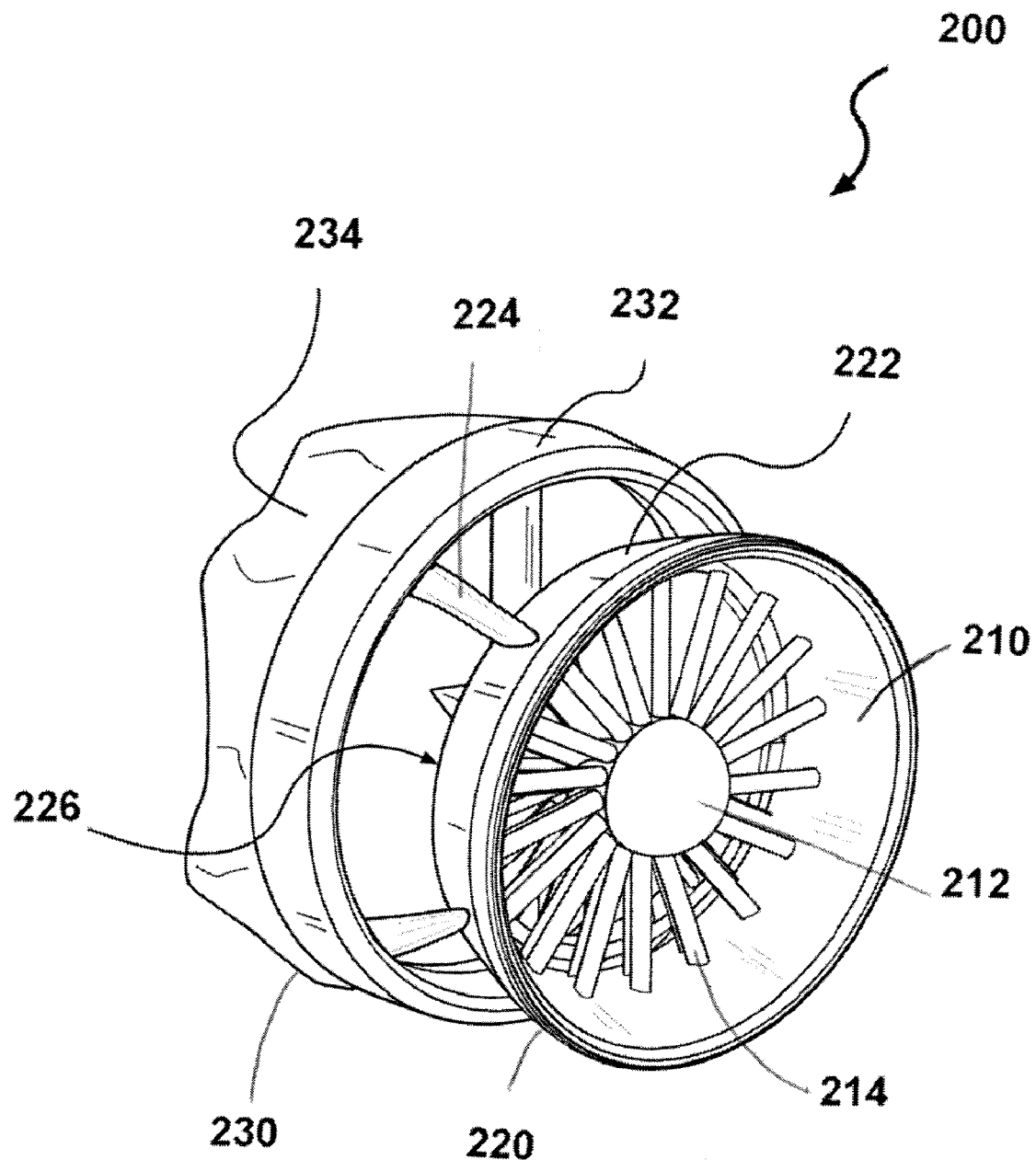
FIG. 5 is a partial perspective view of a fifth exemplary embodiment of the present disclosure.

FIG. 5 shows another exemplary embodiment of the present disclosure. Here, the turbine 200 includes an impeller 210, turbine shroud 220, and ejector shroud 230. The impeller 210 is a rotor-stator assembly. The stator 212 has a plurality of blades 214. The turbine shroud 220 comprises a rigid structural member 222 which surrounds the stator 212 and has a substantially circular shape and defines the leading edge of the turbine shroud. The ejector shroud 230 similarly comprises a rigid structural member 232 also having a substantially circular shape and defining the leading edge of the ejector shroud. Struts 224 join the shroud rigid member 222 and the ejector rigid member 232 together. The turbine shroud 220 also comprises an inflatable member (not shown), and the ejector shroud 230 also comprises an inflatable member 234. In this embodiment, the inflatable member is designed to deflate and compress to alter the shape of the turbine for protection in high wind situations or ice storms. The shroud rigid structural member 222 includes a hollow interior into which the inflatable member may be drawn. It should be understood that in this figure, the hollow interior is on the trailing edge 226 of the shroud rigid member 222 and is not visible. The turbine shroud 220 is shown here with the inflatable member fully compressed and stored in the shroud rigid member 222. Similarly, the ejector inflatable member 234 may also be deflated and stored in a hollow interior in the ejector rigid structural member 232.

Figure 6A:
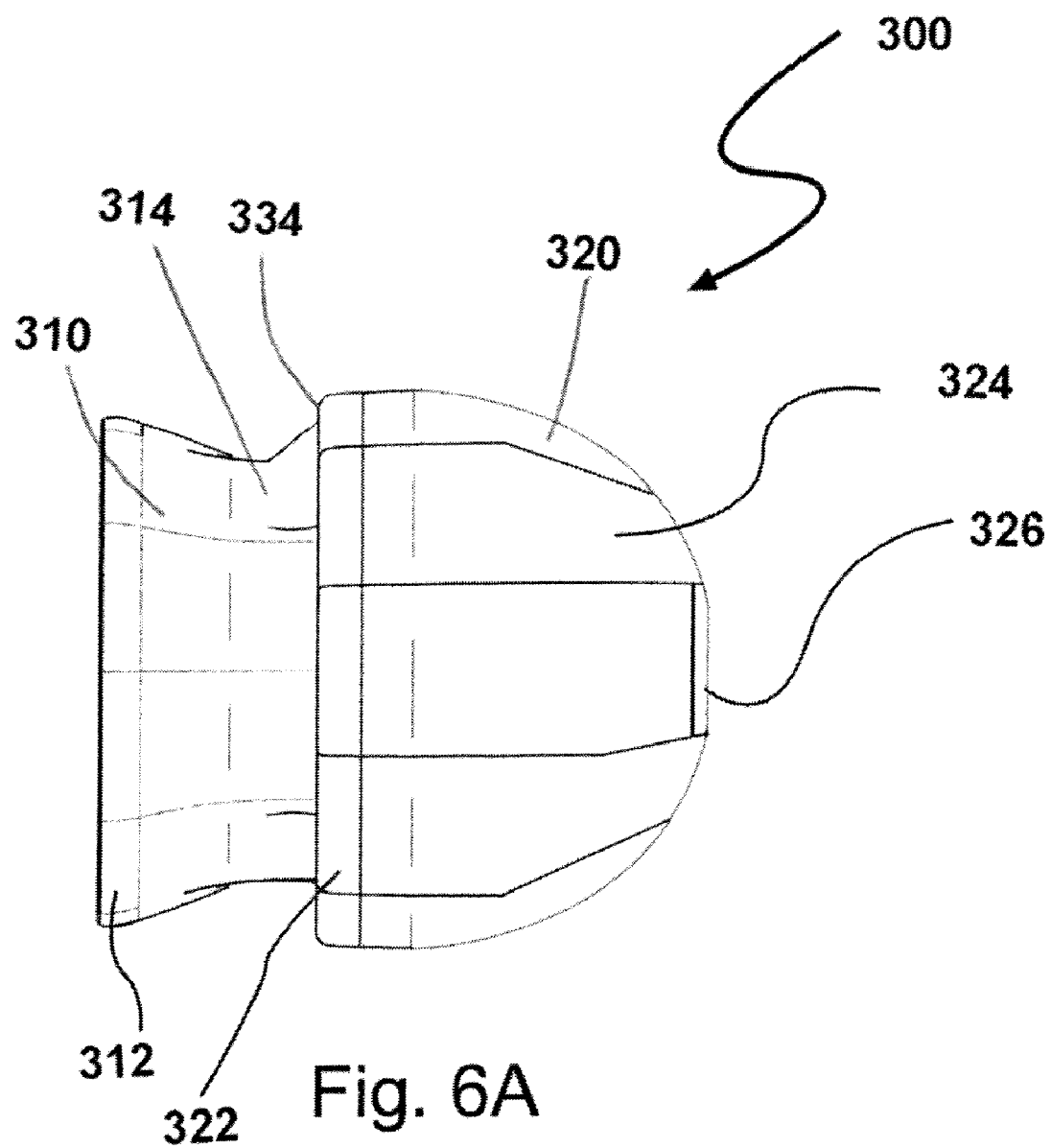
FIG. 6A is a side view of a sixth exemplary embodiment of the present disclosure.
Figure 6B:
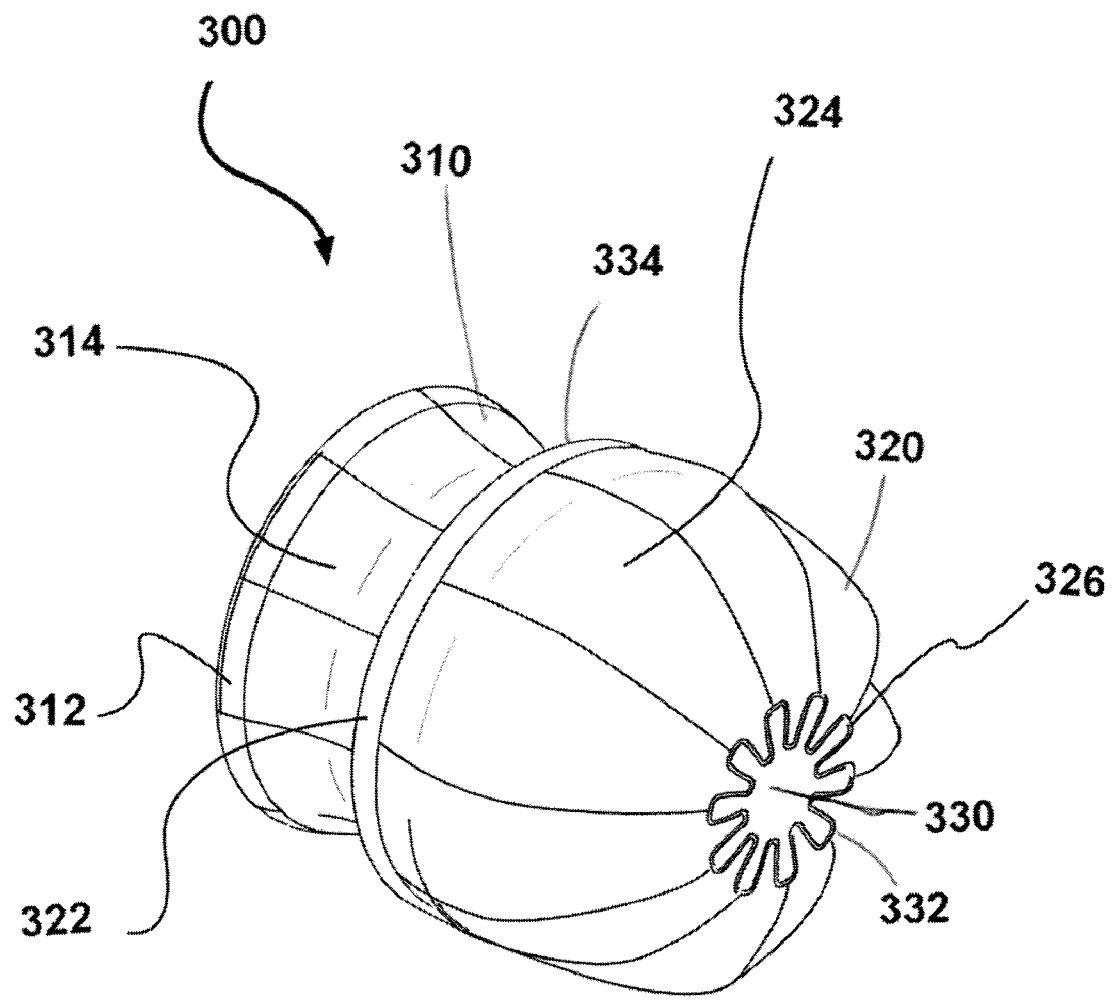
FIG. 6B is a perspective view of a sixth exemplary embodiment of the present disclosure.

FIGS. 6A and 6B are two views of another exemplary embodiment. Again, the turbine 300 includes a turbine shroud 310 and an ejector shroud 320. The turbine shroud comprises a rigid structural member 312 and an inflatable member 314, shown here fully inflated. The ejector shroud also comprises a rigid structural member 322 and an inflatable member 324. Here, however, the ejector inflatable member 324 has sufficient flexibility that it can take different forms or shapes depending on the degree of inflation. Here, the inflatable member 324 is shown as only partially inflated, such that the area of the exhaust end 326 is reduced. As shown here, this reduced area constricts the flow of air through the turbine, reducing air flow and thus reducing any stress on the impeller or rotor-stator assembly which might occur in high wind situations. Put in different words, the ejector inflatable member 324 is configured so that upon partial inflation, the area 330 circumscribed by the trailing edge 332 of the ejector inflatable member is less than the area circumscribed by the leading edge 334 of the ejector shroud. Please note that the area circumscribed by the leading edge refers to the entire area defined by the leading edge, not only the annular area between the turbine shroud 310 and ejector shroud 320.

Figure 7A:
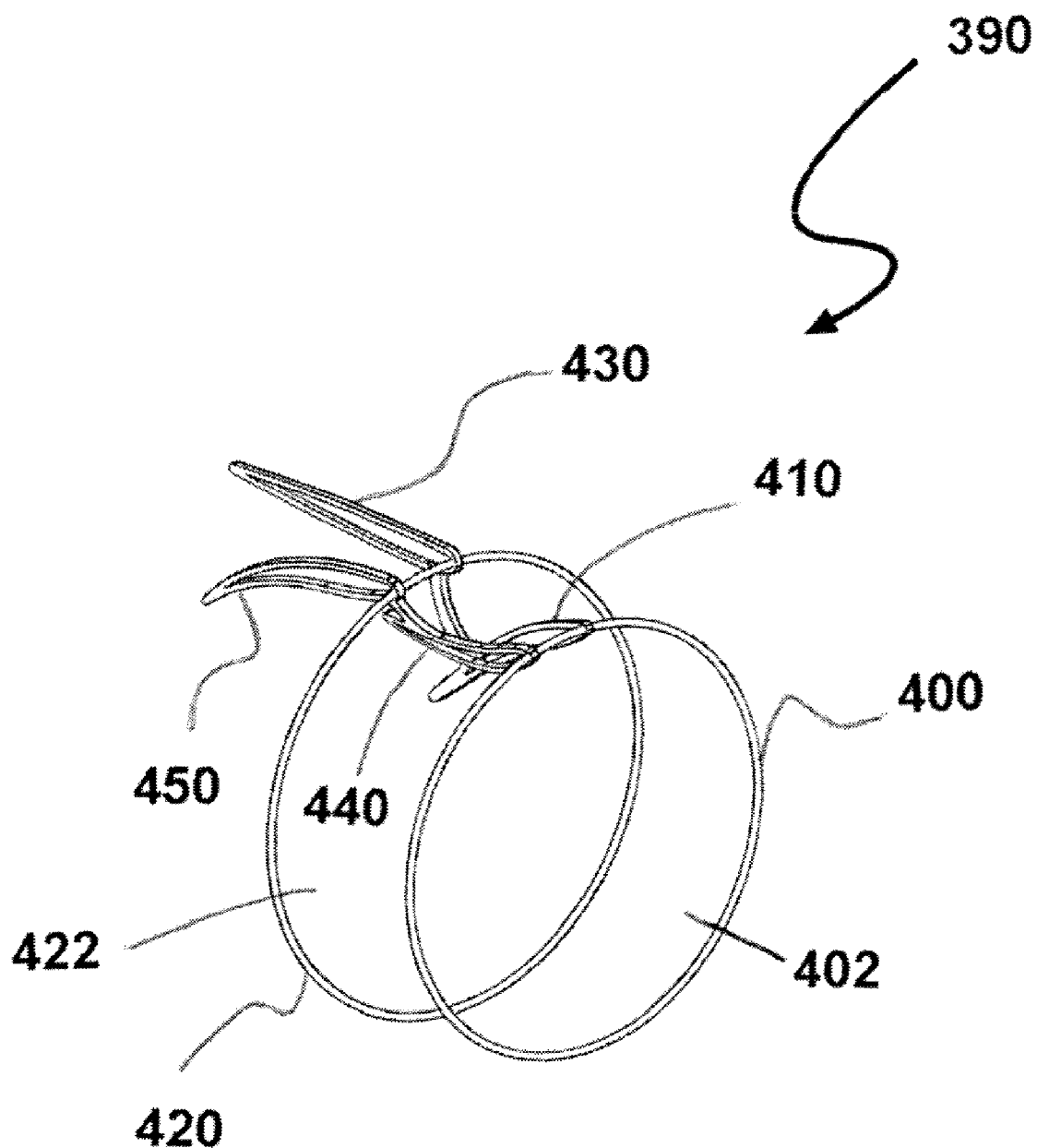
FIGS. 7A-7D are perspective views showing various stages of the construction process for additional exemplary embodiments of the present disclosure.
Figure 7B:
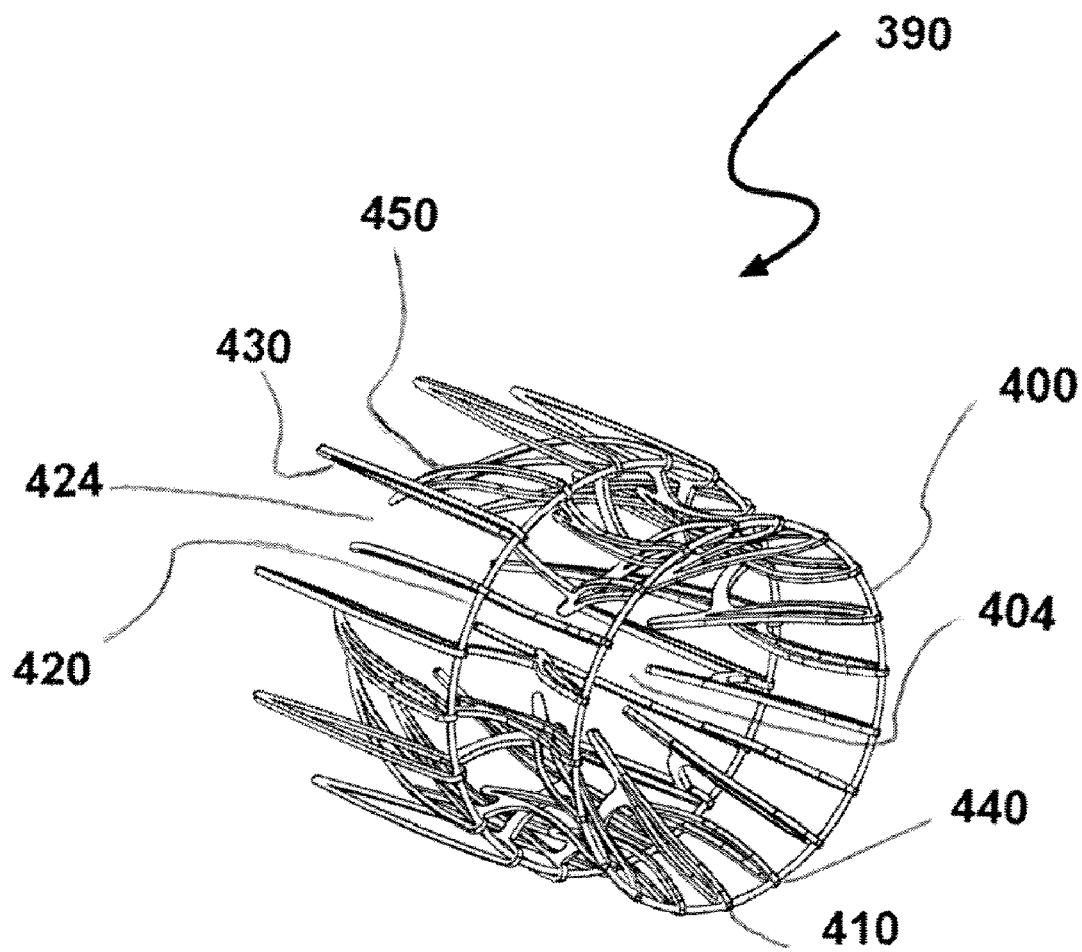
Figure 7C:
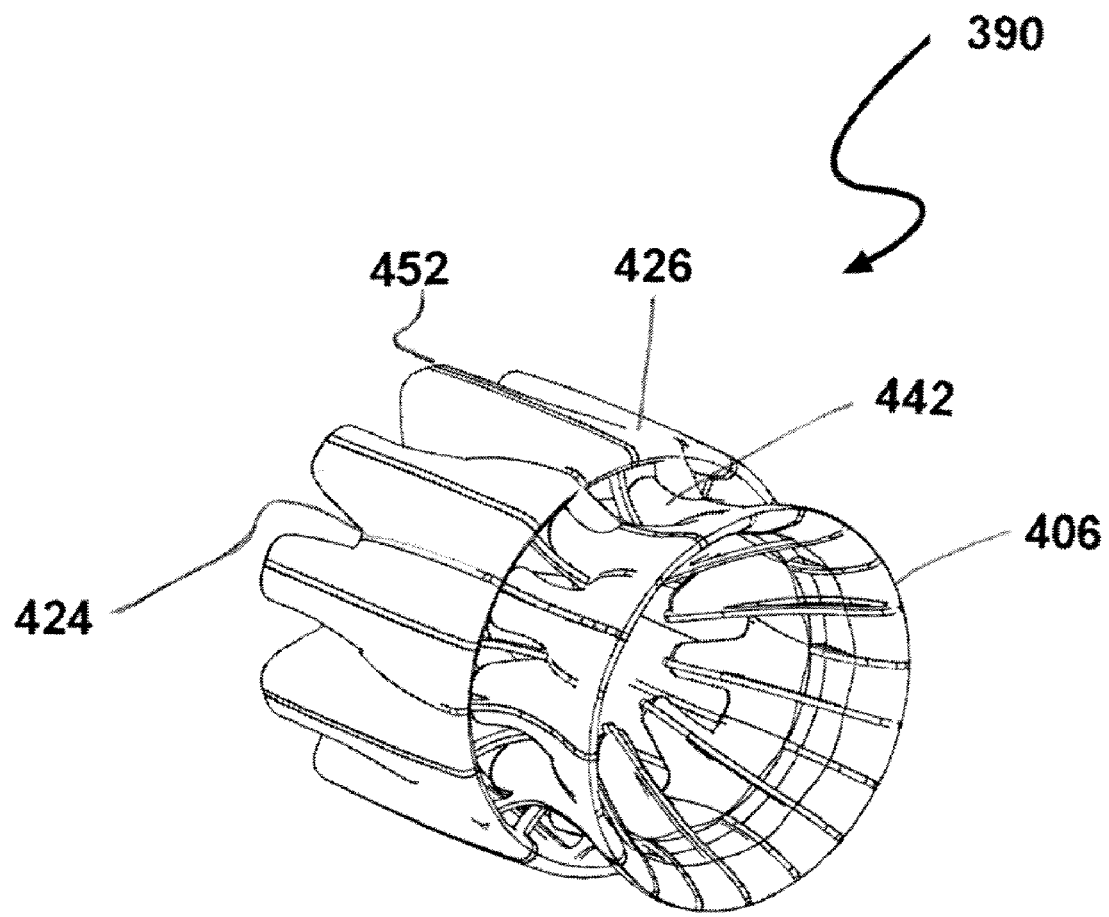

FIGS. 7A-7C show various stages of the construction of other exemplary embodiments of a shroud and/or ejector useful for a wind turbine of the present disclosure. The impeller is not shown in these figures. Here, the combination shroud/ejector 390 comprises a circular member 400 and a plurality of shroud first rib members 410 which together define an intake end 402 and an exhaust end 404 for the turbine shroud. The circular member 400 and the plurality of shroud first rib members 410 are then covered by an exterior film material 406 to complete the turbine shroud. The exhaust end 404 of the turbine shroud may have a smaller area than the intake end 402. Similarly, the ejector shroud comprises a circular member 420 and a plurality of ejector first rib members 430 which together define an intake end 422 and an exhaust end 424 for the ejector shroud. The circular member 420 and the plurality of ejector first rib members 430 are then covered by an exterior film material 426 to complete the ejector shroud. In some embodiments, the shroud circular member 400 and ejector circular member 420 are also connected to each other by the shroud first rib members 410.

In additional embodiments, the turbine shroud may include a plurality of shroud second rib members 440. The shroud second rib members 440 connect the shroud circular member 400 and ejector circular member 420 together. Together, the shroud first rib members 410 and shroud second rib members 440 define a plurality of mixer lobes 442 at the exhaust end 404 of the shroud. Generally, the shroud first rib members 410 and shroud second rib members 440 have different shapes. Similarly, in additional embodiments, the ejector shroud may include a plurality of ejector second rib members 450. Together, the ejector first rib members 430 and ejector second rib members 450 define a plurality of mixer lobes 452 at the exhaust end 424 of the ejector. Generally, the ejector first rib members 430 and ejector second rib members 450 have different shapes.

As seen in FIG. 7A, shroud first rib member 410 and ejector first rib member 430 connect to ejector circular member 420 at the same location. Similarly, shroud second rib member 440 and ejector second rib member 450 connect to ejector circular member 420 at the same location. This connection at the same location for the various rib members is not required.

Figure 7D:
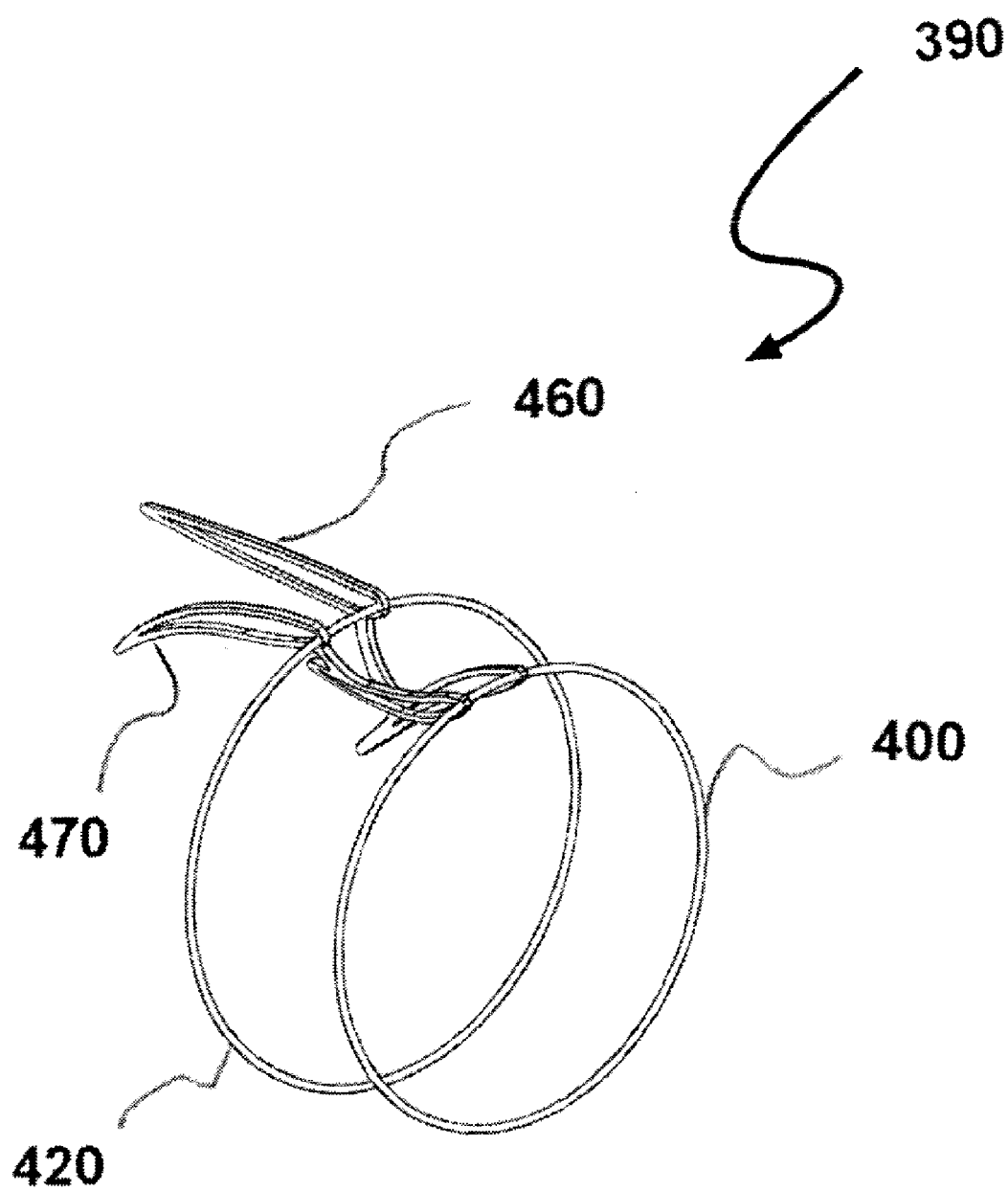

Alternatively, as described in FIG. 7D, the combination shroud/ejector 390 can be considered as comprising a first circular member 400, a second circular member 420, a plurality of first internal ribs 460, and a plurality of second internal ribs 470. The combination of the two circular members, first internal ribs, and second internal ribs define the shape of the turbine shroud, lobes on the turbine shroud, the ejector shroud, and lobes on the ejector shroud. The turbine shroud is defined by the area between the two circular members 400 and 420, while the ejector shroud is located downstream of the second circular member 420. Compared to FIG. 7A, first internal rib 460 can be considered a one-piece combination of shroud first rib member 410 and ejector first rib member 430 while second internal rib 470 can be considered a one-piece combination of shroud second rib member 440 and ejector second rib member 450.

Figure 8A:
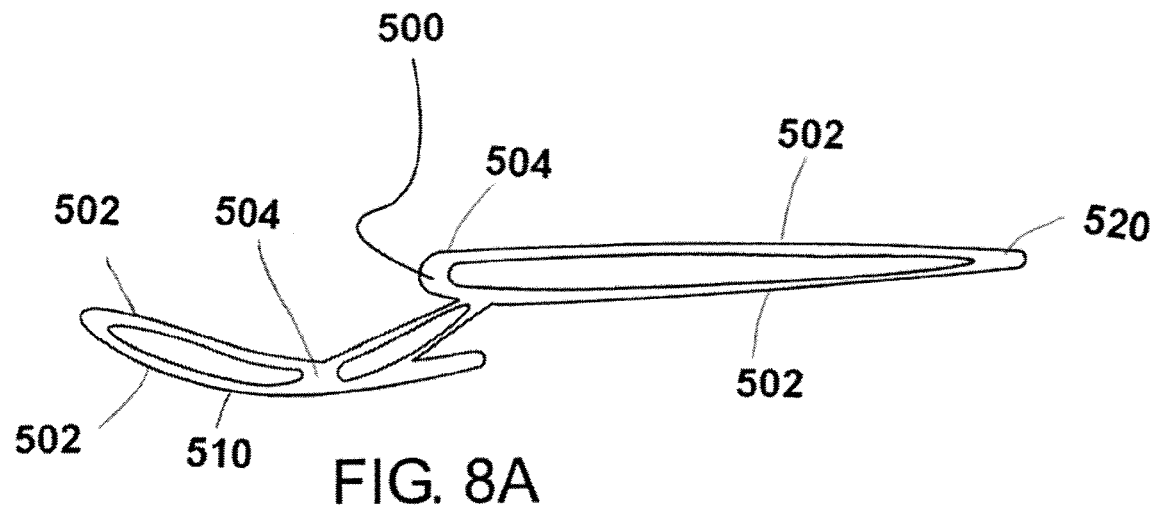
FIGS. 8A-8C are side views of various internal rib members which can be used in exemplary embodiments of the present disclosure.
Figure 8B:
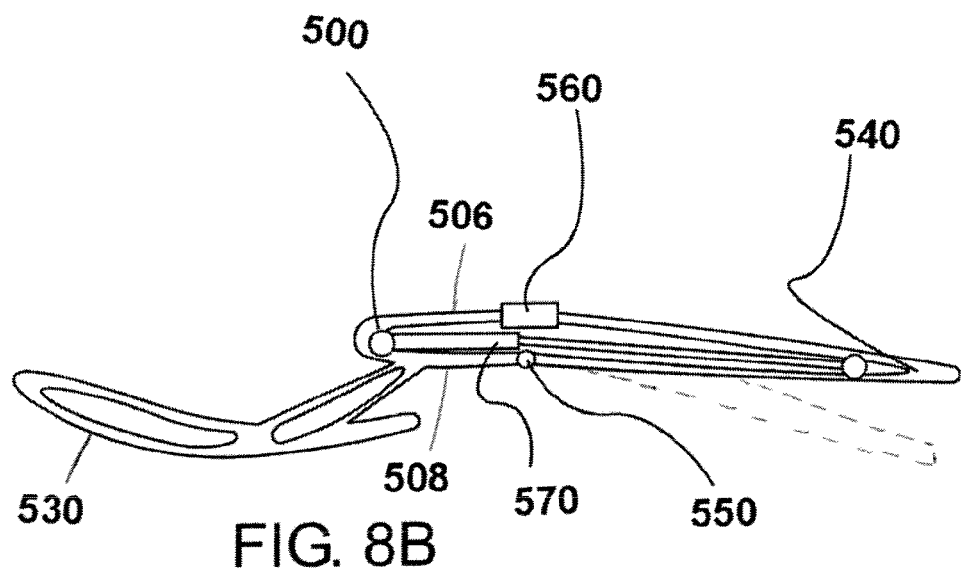
Figure 8C:
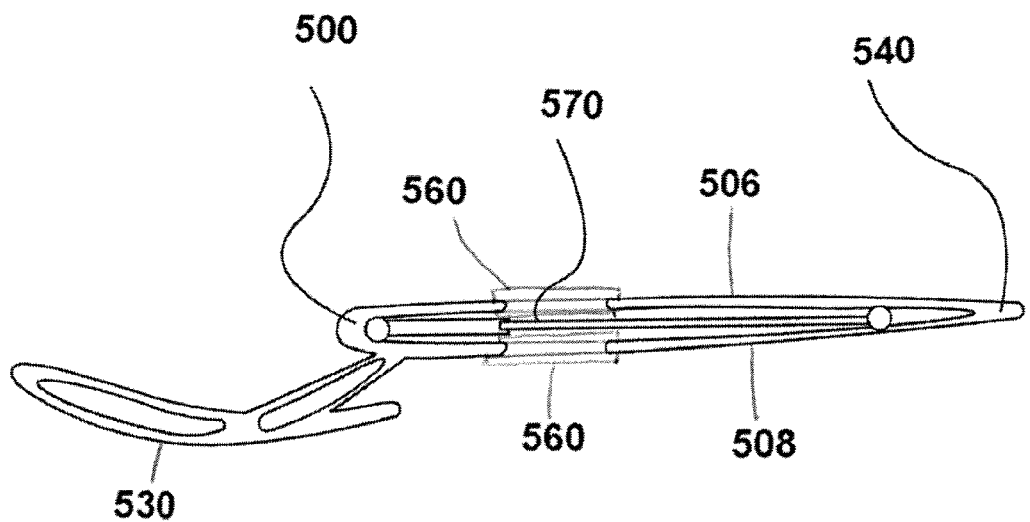

FIGS. 8A-8C are side views of various embodiments of internal ribs suitable for use in various embodiments as shown in FIGS. 7A-7C. In FIG. 8A, the rib 500 comprises an arcuate member 510 and a transverse member 520 integrally formed together to form a generally rigid rib. The members are generally lightweight and can be considered as beams 502 joined together by struts 504. The arcuate member 510 defines the shape of the turbine shroud, while the transverse member 520 defines the shape of the ejector shroud.

Referring to FIG. 8B, the rib 500 comprises a stationary member 530 and an actuated member 540. The stationary member 530 defines the shape of the turbine shroud, while the actuated member 540 defines the shape of the ejector shroud. The stationary member 530 and actuated member 540 are joined together along a bottom edge 508 by a pivot 550, which defines an angle between them. The stationary member 530 and actuated member 540 are joined together along a top edge 506 by a sleeve or linear motion member 560. An actuator 570 engages both the stationary member 530 and actuated member 540 so as to change the angle between them, thus changing the shape of the shroud and/or ejector. The solid outline shows a shortened or linear position, while the dashed outline shows a lengthened or angled position. This ability to change shape allows the overall skeleton of the turbine shroud or ejector shroud to move/change shape as well.

Referring to FIG. 8C, the stationary member 530 and actuated member 540 are joined together at both the top and bottom edges 506, 508 by a sleeve or linear motion member 560 which, together with the actuator 570, changes the length of the rib 500.

Figure 8D:
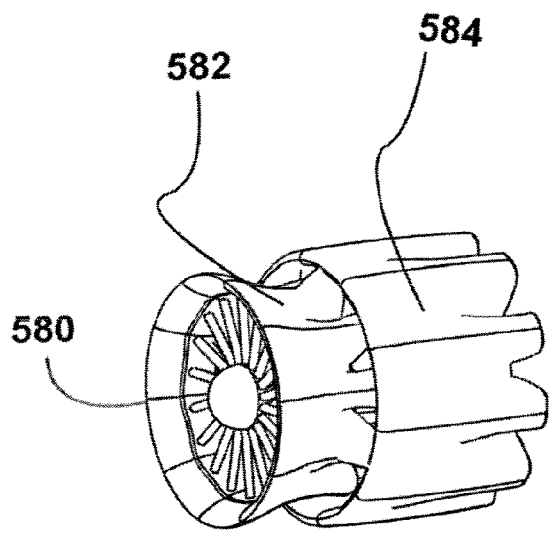
FIGS. 8D-8E show wind turbines before and after the use of various internal rib members such as those shown in FIGS. 8A-8C.
Figure 8E:
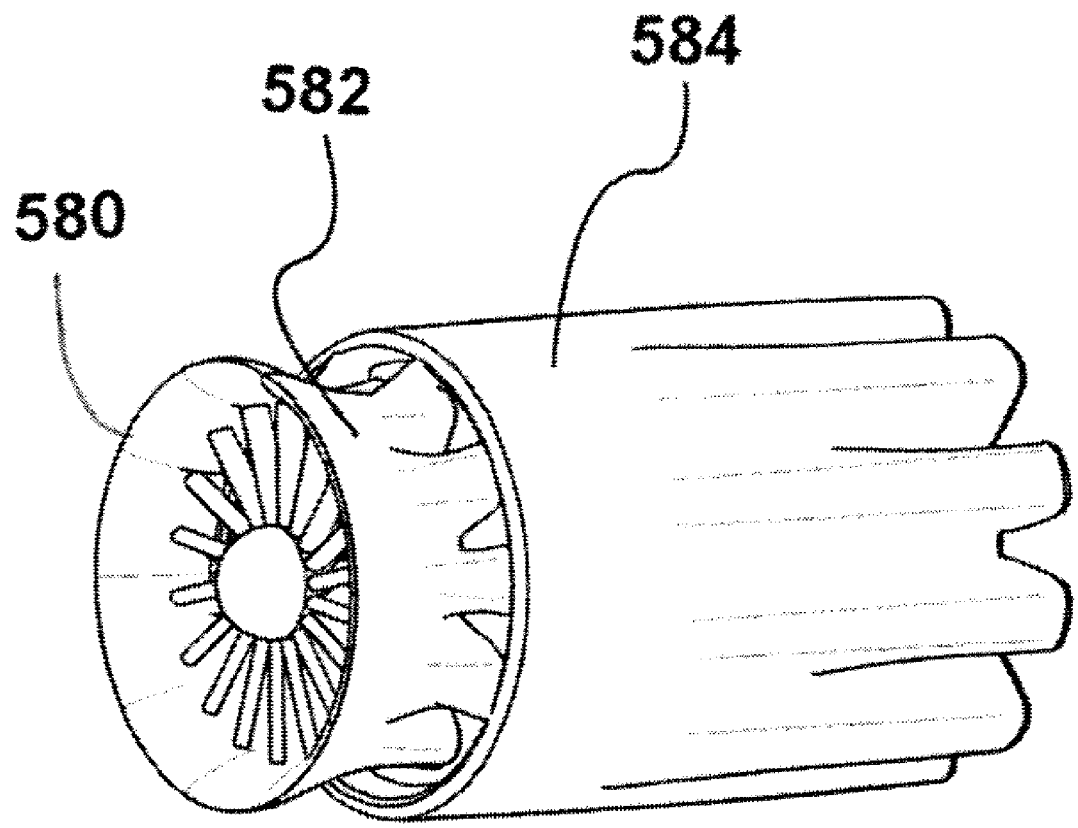

FIG. 8D shows a turbine 580 with turbine shroud 582 and ejector shroud 584. Here, the rib members of the ejector (not shown) are in their shortened position. In FIG. 8E, the rib members of the ejector shroud are in their lengthened position, resulting in an ejector of greater length and different air flow characteristics. Thus, the flexible nature of the rib members in the wind turbine enables changes in configuration to accommodate different wind conditions.

Figure 9:
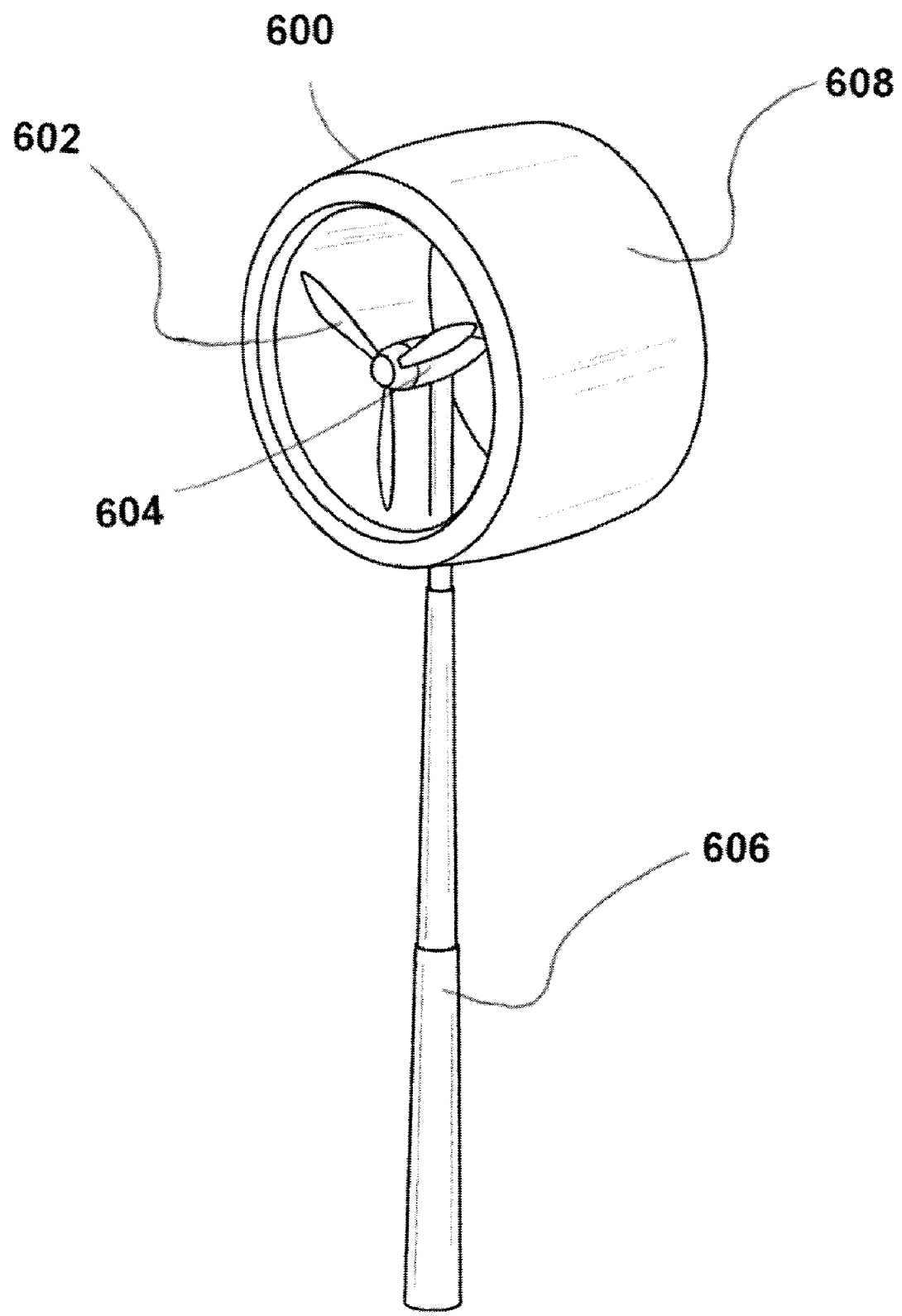
FIG. 9 is a perspective view of an eighth exemplary embodiment of the present disclosure.

In FIG. 9, the wind turbine 600 has an impeller shown as a propeller 602 mounted on a power generator 604 and which is supported on a pole 606. An inflatable shroud 608 is disposed about the propeller 602. Thus, the inflatable shroud may be employed with an existing type of wind turbine.

Figure 10:
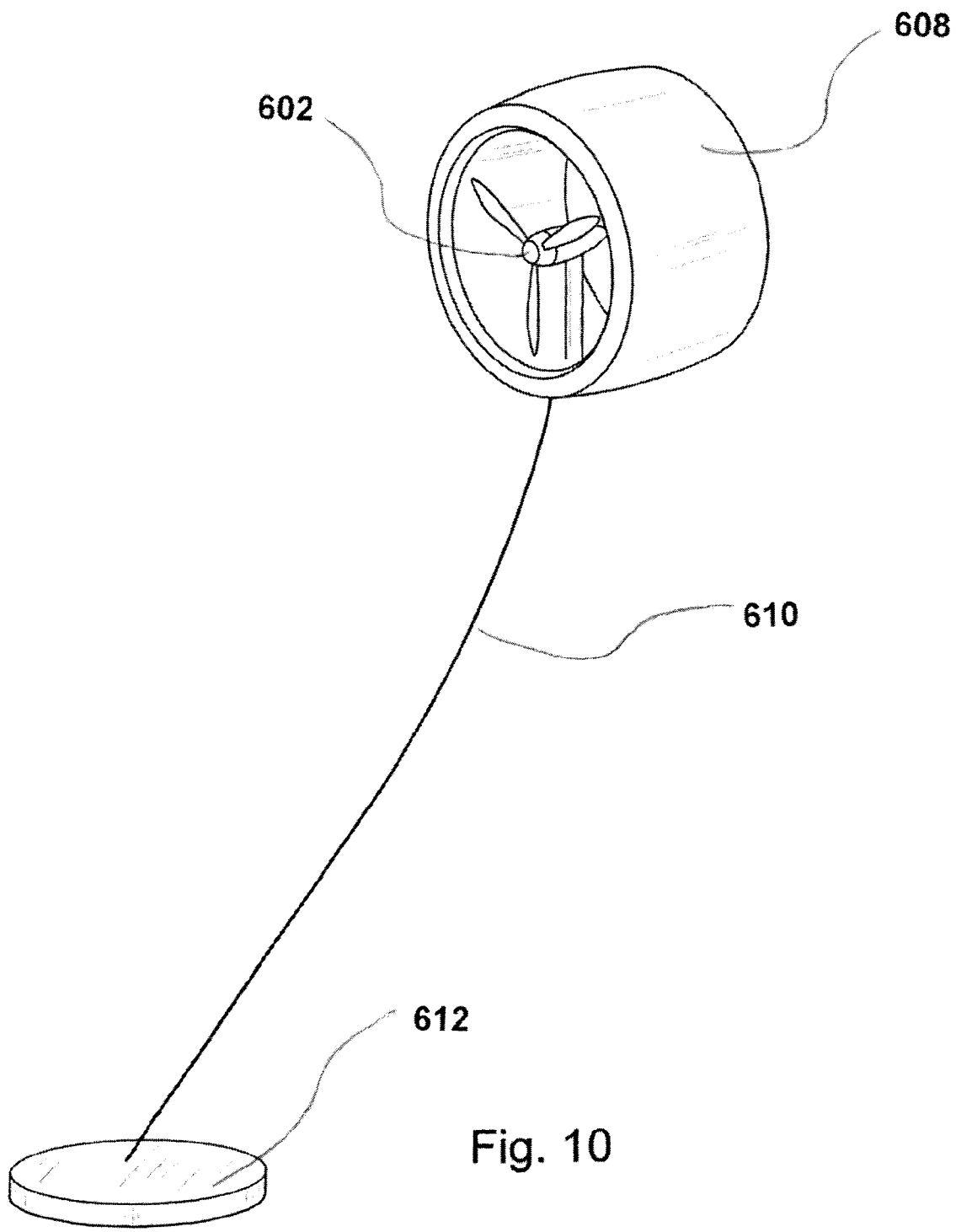
FIG. 10 is a perspective view of a ninth exemplary embodiment of the present disclosure.

FIG. 10 is an alternate embodiment wherein the turbine 600 is not supported by a pole. Instead, the inflatable shroud 608 has been inflated with a gas that is lighter than air, such as hydrogen, helium, ammonia, or methane. This provides sufficient buoyancy for the turbine 600 to ascend freely. The turbine 600 is tethered by a tether line or cable 610 which is connected to a controller which may lengthen or shorten the tether 610. Thus, no supporting structure other than the tether 610 is required. The base 612 may contain a reel or spool for controlling the length of the tether 610. This feature provides a simple and rapidly responsive means of lowering the turbine 600 in the event of excessively high winds.

The inflatable members described here may include several internal chambers within for controlling the amount of lift or the degree of inflation. These internal chambers may be arranged around the circumference of the inflatable member, or from one end of the inflatable member to the other end, as suitable.

The thin film material used for forming the inflatable member for the shroud and/or ejector as well as the exterior film may be generally formed of any polymeric or fabric material. Exemplary materials include polyurethane, polyfluoropolymers, and multi-layer films of similar composition. Stretchable fabrics, such as spandex-type fabrics, may also be employed.

Polyurethane films are tough and have good weatherability. The polyester-type polyurethane films tend to be more sensitive to hydrophilic degradation than polyether-type polyurethane films. Aliphatic versions of these polyurethane films are generally ultraviolet resistant as well.

Exemplary polyfluoropolymers include polyvinyldidene fluoride (PVDF) and polyvinyl fluoride (PVF). Commercial versions are available as KYNAR and TEDLAR. Polyfluoropolymers generally have very low surface energy, which allow their surface to remain somewhat free of dirt and debris, as well as shed ice easier compared to materials having a higher surface energy.

Film/fabric composites are also contemplated along with a backing, such as foam, for making the inflatable member or exterior film.

The inflatable members could also be composed of urethane film bladders with a woven or braided cover over the bladder to give it strength and durability. The woven or braided materials may be polyester, pre-stressed polyester, aromatic polyester (trade name VECTRAN® manufactured by Kuraray of Japan), p-phenylene terephtalamide (PpPTA) (trade name TWARON from Akzo), PPTA (poly-paraphenylene terephthalamide) (trade name KEVLAR from DuPont), and polytrimethylene terephthalate (trade name CORTERRA from Shell). The exterior of the woven or braided cover may be coated with various polymers such as cis-polyisoprene, polyurethane, epoxy or polyvinyl chloride. This protects the woven or braided fibers from environmental attack, such as UV or abrasion from sand or other materials that could damage the fibers. Manufacturers include Federal Fabrics-Fibers of Lowell, Mass.; Warwick Mills of New Ipswich, N.H.; Vertigo Inc of Lake Elsinore, Calif.; and ILC Dover of Frederica, Del. The inflatable members may also be partially or completely stiffened through the use of reactive polymer infusion through vacuum assisted resin transfer molding (VARTM) or the curing of previously impregnated polymers such as unsaturated polyesters, epoxy, acrylates or urethanes that are cured through radiation, free radical initiation, or crosslinking with isocyanate.

The inflatable construction of the shroud and/or ejector in the wind turbines of the present disclosure allows the turbine to be substantially lighter than conventional turbines. Thus, a less substantial supporting tower may be used.

The systems and methods of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A wind turbine comprising:
an impeller;
a turbine shroud disposed about the impeller, the turbine shroud comprising an inflatable member; and
a first rigid structural member connected to the inflatable member, the first rigid structural member comprising a hollow interior into which the shroud inflatable member can be inserted.

2. The wind turbine of claim 1, wherein the first rigid structural member defines a leading edge of the turbine shroud.

3. The wind turbine of claim 1, wherein the turbine shroud further comprises a second rigid structural member connected to the inflatable member opposite the first rigid structural member, the second rigid structural member defining a trailing edge of the turbine shroud.

4. The wind turbine of claim 3, wherein the second rigid structural member is shaped to provide the turbine shroud with a plurality of mixing lobes.

5. The wind turbine of claim 1, wherein the inflatable member is shaped to provide a plurality of mixing lobes around a trailing edge thereof.

6. The wind turbine of claim 1, further comprising an ejector shroud disposed concentrically about the turbine shroud, the ejector shroud comprising an inflatable member.

7. The wind turbine of claim 6, wherein the ejector shroud further comprises a first rigid structural member connected to the ejector inflatable member.

8. The wind turbine of claim 7, wherein the ejector first rigid structural member comprises a hollow interior into which the ejector inflatable member can be inserted.

9. The wind turbine of claim 7, wherein the ejector first rigid structural member defines a leading edge of the ejector shroud.

10. The wind turbine of claim 7, wherein the ejector shroud further comprises a second rigid structural member connected to the ejector inflatable member opposite the ejector first rigid structural member, the second rigid structural member defining a trailing edge of the ejector shroud.

11. The wind turbine of claim 10, wherein the ejector second rigid structural member is shaped to provide the ejector shroud with a plurality of mixing lobes.

12. The wind turbine of claim 6, wherein the ejector inflatable member is configured so that when the ejector inflatable member is partially inflated, a trailing edge of the ejector inflatable member circumscribes an area which is less than an area circumscribed by a leading edge of the ejector inflatable member.

13. The wind turbine of claim 6, wherein the ejector inflatable member is shaped to provide a plurality of mixing lobes around a trailing edge thereof.

14. The wind turbine of claim 1, wherein the inflatable member is in the shape of a ring airfoil.

15. A wind turbine comprising:
a turbine shroud; and
an ejector shroud disposed concentrically about the turbine shroud;
the turbine shroud comprising a shroud circular member, a plurality of shroud first rib members engaging the shroud circular member, and a shroud exterior film, wherein the shroud circular member and the plurality of shroud first rib members define an intake end and an exhaust end of the turbine shroud; and
the ejector shroud comprising an ejector circular member, a plurality of ejector first rib members engaging the ejector circular member, and an ejector exterior film, wherein the ejector circular member and the plurality of ejector first rib members define an intake end and an exhaust end of the ejector shroud.

16. The wind turbine of claim 15,
wherein the turbine shroud further comprises a plurality of shroud second rib members, each shroud second rib member extending between the shroud circular member and the ejector circular member; and
wherein the plurality of shroud first rib members and the plurality of shroud second rib members together define a plurality of mixer lobes at the exhaust end of the turbine shroud.

17. The wind turbine of claim 15,
wherein the ejector shroud further comprises a plurality of ejector second rib members engaging the ejector circular member; and
wherein the plurality of ejector first rib members and the plurality of ejector second rib members together define a plurality of mixer lobes at the exhaust end of the ejector shroud.

18. The wind turbine of claim 15, wherein each of the plurality of ejector first rib members comprises a stationary member and an actuated member joined together at a pivot to alter an angle between the stationary member and the actuator member.

19. The wind turbine of claim 15, wherein each of the plurality of ejector first rib members comprises a stationary member and an actuated member joined together so that the length of the ejector first rib member can be altered.

20. A wind turbine comprising:
a rotor;
a turbine shroud disposed about the rotor, the turbine shroud comprising an inflatable member; and
a first rigid structural member connected to the inflatable member, the first rigid structural member comprising a hollow interior into which the shroud inflatable member can be inserted.

21. The wind turbine of claim 20, wherein the first rigid structural member defines a leading edge of the turbine shroud.

22. The wind turbine of claim 20, wherein the turbine shroud further comprises a second rigid structural member connected to the inflatable member opposite the first rigid structural member, the second rigid structural member defining a trailing edge of the turbine shroud.

23. The wind turbine of claim 22, wherein the second rigid structural member is shaped to provide the turbine shroud with a plurality of mixing lobes.

24. The wind turbine of claim 20, wherein the inflatable member is shaped to provide a plurality of mixing lobes around a trailing edge thereof.

25. The wind turbine of claim 20, further comprising an ejector shroud disposed concentrically about the turbine shroud, the ejector shroud comprising an inflatable member.

26. The wind turbine of claim 25, wherein the ejector inflatable member is configured so that when the ejector inflatable member is partially inflated, a trailing edge of the ejector inflatable member circumscribes an area which is less than an area circumscribed by a leading edge of the ejector inflatable member.

27. The wind turbine of claim 20, wherein the inflatable member is in the shape of a ring airfoil.

* * * * *